Patented Nov. 17, 1931

1,832,322

UNITED STATES PATENT OFFICE

WALTER M. RALPH, OF HAMBURG, NEW YORK, ASSIGNOR TO NATIONAL ANILINE & CHEMICAL COMPANY, INC., OF NEW YORK, N. Y., A CORPORATION OF NEW YORK

PRODUCTION OF POLYAZO COLORING MATTERS

No Drawing. Application filed January 3, 1927. Serial No. 158,830.

This invention relates to the manufacture and production of new polyazo coloring matters, more particularly trisazo coloring matters of the benzidine series. It includes the new products and the material dyed by the same.

In United States Patent No. 688,478 there is described the production of polyazo dyestuffs which in the free state correspond with the following probable formula:

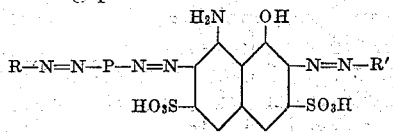

in which R represents an aromatic radical containing two amino groups as substituents in meta-position to each other, P a diphenyl radical or homologue thereof, and R' an aromatic radical, e. g. phenyl, etc. These dyestuffs are manufactured by coupling a tetrazotized benzidine body, e. g. benzidine, tolidine or dianisidine, with one molecular proportion of H-acid (i. e. 1:8-aminonaphthol 3:6-disulfonic acid) in acid solution to produce a diazo-monazo body (first intermediate), then coupling this diazo-monazo body in alkaline solution with one molecular proportion of a diazo compound (e. g. of aniline) to produce a diazo-disazo body (second intermediate), and finally coupling the diazo-disazo body with one molecular proportion of an aromatic meta-diamine to produce the final dyestuff.

It is well known that the production of these dyestuffs according to the procedure outlined above is attended with difficulties, particularly in carrying out the second step wherein the diazo compound is coupled with the diazo-monazo body (first intermediate) for the production of the diazo-disazo body or second intermediate.

If, in carrying out the second step for the production of the second intermediate, the alkali is added to the diazo-monazo body prior to the addition of the diazo compound as the patent directs, then coupling of one molecule of diazo-monazo body with a second molecule of the same immediately begins to take place, and although the product from such a coupling is still capable of coupling and of being coupled, nevertheless the product or products resulting from such couplings are both in shade and dyeing properties quite unlike those resulting from coupling one molecule of the diazo compound into one molecule of diazo-monazo body. The amount of coupling of one molecule of diazo-monazo body with another molecule of the same depends mainly upon the lapse of time between the addition of the alkali and the subsequent addition of the diazo compound. For this reason current practice differs from the directions of the patent in that the acid diazo compound is added to the acid suspension of the diazo-monazo body and the mixture then made alkaline. Under these conditions, and particularly when a distinct excess of the diazo compound is employed, a much more homogeneous product is obtained than when the directions of the patent are followed, and the yield of finished dyestuff is markedly improved.

The excess of the diazo compound remaining at the completion of the second coupling is an undesirable feature of the reaction since, unless destroyed or otherwise removed prior to the final coupling with the meta-diamine, it couples with said meta-diamine and produces a chrysoidine or chrysoidine-like body. The contamination of the final dyestuff with this chrysoidine body prevents or hinders the dyestuff, on cotton and on other fibres, from being discharged to a pure white; and produces undesirable brown to yellow stains on cellulose acetate effect threads which are left white if the dyestuff be free from such contamination basic impurities.

The elimination or removal of the excess diazo compound after the completion of the second step and prior to the final coupling with consequent elimination of chrysoidine in the finished dyestuff may be accomplished in several ways; as for example, decomposition by allowing the mixture to stand, by the aid of heat or by the aid of chemical agents which decompose it and form therefrom end products which are not dyestuffs; or coupling with various simple substances to form dyestuffs which are either eliminated in the mother liquor from the final filtration of the finished product or left in the final dyestuff, if their presence in the final dyestuff is not objectionable. None of these methods of elimination of the excess diazo compound is very satisfactory since they all affect not only the diazo compound itself but the uncombined diazo group of the diazo-disazo intermediate as well, thus entailing a large loss in yield of the final dyestuff and contaminating it with objectionable impurities.

According to the present invention, I have found that, when monazo dyes capable of being coupled with diazo compounds are added to the alkaline mixture containing the uncombined excess of diazo compound and the diazo-disazo body (second intermediate), very little or no coupling takes place between the diazo-disazo body and the monazo dyestuff whereas the diazo compound couples easily and quickly with the monazo dyestuff. The use of monazo dyes having the following probable formula

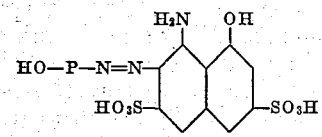

in which P represents a diphenyl radical or a derivative thereof, have been found to be particularly advantageous since they readily couple with the diazo compound to give products or a product which is identical with or closely related to products normally occurring in small quantities in the final trisazo dyestuff as a result of the unavoidable thermal decomposition of diazo groups during the various steps of manufacture. Their presence in the final trisazo dyestuff is unobjectionable and adds to the tinctorial value of the whole.

These particular monazo dyes are preferably prepared by the hydrolytic decomposition of the diazo-monazo dye which is obtained as the first intermediate in the process for making the final trisazo dye. They readily combine with diazo compounds to give dyestuffs having the following probable formula:

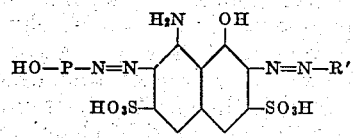

where P represents a diphenyl nucleus which may contain substituents and R' a radical of the aromatic series, for example, phenyl, etc. Due to the removal of the excess diazo compound in the aforesaid manner the final trisazo dyestuff prepared from a diazo-disazo product so processed is substantially free from chrysoidine bodies.

The following specific example will further illustrate the invention, it being understood that the invention is not limited thereto.

*Example.*—To a well-stirred alkaline solution at a temperature of about 0°–2° C., which contains diazobenzene sulfate in relatively small amount and a suspension of the diazo-disazo intermediate body which in the free state probably corresponds with the following formula:

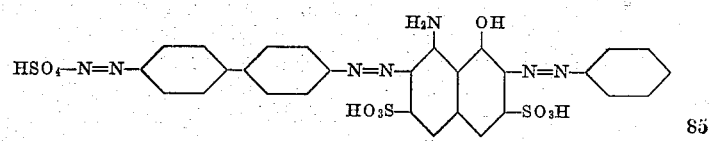

and which has been produced in any well known manner, for example, by first coupling 1:8-aminonapthol-3:6-disulfonic acid (one mole) in acid solution with tetrazotized benzidine (one mole) and then with diazobenzene in alkaline solution (a slight excess of one mole of diazo-benzene sulfate being employed in carrying out the second coupling), there is slowly added a cold, dilute (two to three percent) alkaline solution of pp'-hydroxydiphenyl-7-azo-3:6-disulfo-8-amino-1-napthol (prepared in any suitable manner, for example, by boiling pp'-diazo-diphenyl-7-azo-3:6-disulfo-8-amino-1-napthol in dilute sulphuric acid and subsequently dissolving the product thus obtained, without isolation, in caustic soda or sodium carbonate) until a sample of the reaction mixture when tested by treating it with common salt and then with a suitable coupling reagent shows the absence of diazobenzene. The resulting solution containing the diazo-disazo body in suspension and now free from the presence of any diazo-benzene is then coupled with one molecular proportion of m-phenylenediamine, or m-tolylenediamine or other suitable aryldiamine in any well known or suitable manner, and the dyestuff isolated in the usual way, e. g., by salting out.

In the above example, the free diazobenzene which is present readily combines with the pp'-hydroxydiphenyl-7-azo-3:6-disulfo-8-amino-1-napthol and produces a dark to bluish-green disazo dyestuff while the diazo-disazo body reacts very little, if at all, with it. Since the solution is free, or substantially so, from the presence of diazobenzene, the trisazo dyestuff thus finally produced by coupling the diazo-disazo body with m-phenylenediamine, or with m-tolyenediamine or other suitable aryldiamines, is substantially free from a chrysoidine body which would be otherwise produced by the action of diazobenzene on the aryldiamine. The dark to bluish-green disazo dyestuff is precipitated and isolated in admixture with the trisazo dyestuff but its presence is not harmful and dyeings on cotton are readily discharged to a white. Further, it stains acetate silk very little or not at all. In the dry state, the resulting final dyestuff is a dark powder, soluble in water and in concentrated sulfuric acid, and dyes unmordanted cotton various shades of black which are readily discharged to a white. It is substantially free from chrysoidine bodies and stains acetate silk very little or not at all. The final dyestuff produced when m-phenylenediamine is used in the final coupling is a dark powder soluble in water with a greenish-black to black color, and in concentrated sulfuric acid with a blue-black color which on dilution with water gives a reddish black precipitate. It dyes unmordanted cotton greenish to bluish shades of black.

In a similar manner, in the production of a trisazo coloring matter by coupling an aryldiamine with a diazo-disazo body wherein the diazo-disazo body is prepared by coupling an excess of a diazo compound with a diazo-monazo body of the benzidine series, the present invention is generally applicable for removing the uncombined diazo compound which may be present in the reaction mixture at the completion of the formation of the diazo-disazo body by combining said diazo compound with any suitable monazo dyestuff, particularly a monazo dyestuff derivable from said diazo-monazo body by hydrolytic decomposition.

I claim:

1. In the production of a trisazo coloring matter by coupling an aryldiamine with a diazo-disazo body wherein the diazo-disazo body is prepared by reacting a diazotized aromatic amino-body with a diazo-monazo body of the benzidine series and a portion of the diazotized aromatic amino-body is present in the uncombined state in the reaction mixture at the end of the reaction, the improvement which comprises treating the said reaction mixture obtained at the end of the reaction with a monazo dyestuff which is capable of reacting with the said uncombined diazotized aromatic amino-body, whereby said uncombined diazotized aromatic amino-body is converted into a disazo body.

2. In the production of a trisazo dyestuff, the improvement which comprises treating a reaction mixture containing a diazo-disazo compound of the benzidine series and a diazo compound, said reaction mixture resulting from reacting a diazo compound with a diazo-monazo compound of the benzidine series, with an azo dyestuff derived by the hydrolytic decomposition of the said diazo-monazo compound, whereby said diazo compound reacts with said azo dyestuff to form a disazo dyestuff.

3. In the production of a diazo-disazo intermediate product obtainable by treating with diazobenzene a diazo-monazo body having the following formula:

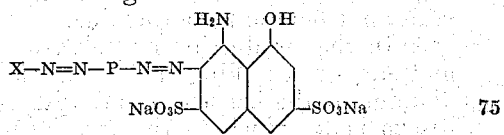

where X represents an acid group and P denotes a diphenyl radical, and wherein a residual amount of uncombined diazobenzene is present in the reaction mixture, the improvement which comprises incorporating with the reaction mixture a monazo dye having the following probable formula:

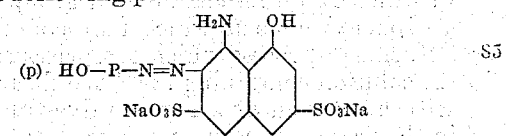

where P represents a diphenyl radical, and coupling said monazo dye with the residual diazobenzene present.

4. In the production of polyazo coloring matters by first coupling a tetrazotized benzidine body with H acid in acid solution, then coupling the resulting diazo-monazo intermediate product with an excess of a monodiazo compound in alkaline solution, and finally coupling the diazo-disazo body thus obtained with an aromatic meta-diamine, a process which comprises incorporating a solution containing the diazo-disazo body and residual monodiazo compound with a solution of a monazo dyestuff derived from the diazo-monazo intermediate product by hydrolytic decomposition in an amount sufficient only to combine with the residual monodiazo compound present, and subsequently coupling the diazo-disazo body with the aromatic metadiamine.

5. In the production of a trisazo dyestuff, the improvement which comprises treating a reaction mixture containing a diazotized aromatic amine of the benzene series and a diazo-disazo body of the benzidine series having the following probable formula:

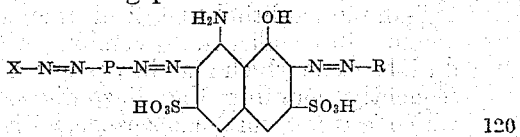

in which X represents an acid radical, P a diphenyl nucleus which may contain substituents, and R a hydrocarbon radical of the benzene series, with a monazo dyestuff having the following probable formula:

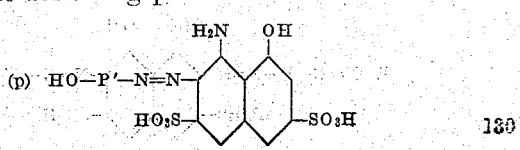

in which P' stands for the same grouping as P, the amount of said monazo dyestuff employed being just sufficient to combine with the said diazotized aromatic amine which is present, to form a disazo dyestuff, and subsequently coupling the diazo-disazo body with an aromatic meta-diamine.

6. In the production of polyazo coloring matters by coupling an aromatic meta-diamine of the benzene series with a diazo-disazo body which in the free state corresponds with the probable formula:

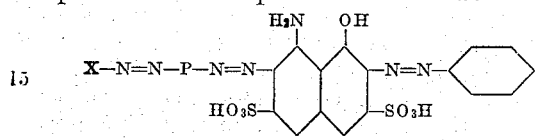

in which X represents an acid group, and P a diphenyl nucleus which may contain substituents, a process which comprises treating the solution containing the diazo-disazo body with a solution of a monazo dyestuff which in the free state corresponds with the probable formula:

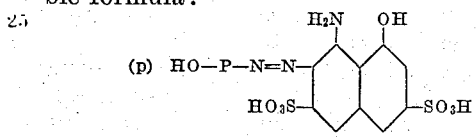

in which P represents a diphenyl nucleus which may contain substituents, in amount just sufficient to combine with any diazobenzene which may be present, and subsequently coupling the diazo-disazo body, which is free from diazobenzene, with the aromatic meta-diamine.

7. In the production of polyazo coloring matters by coupling m-phenylenediamine with a diazo-disazo body which in the free state corresponds with the probable formula:

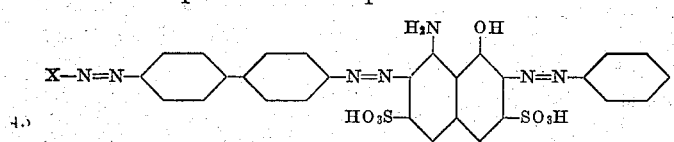

in which X represents an acid group, a process which comprises treating the solution containing the diazo-disazo body with an alkaline solution of pp'-hydroxy-diphenyl-7-azo-1:8-amino-naphthol-3:6-disulfonic acid in amount just sufficient to combine with any diazobenzene which may be present, and subsequently coupling the diazo-disazo body, which is free from diazobenzene, with the m-phenylenediamine.

8. As a new product, the polyazo coloring matter free from a chrysoidine body, and comprising a trisazo dyestuff having in the free state the following probable formula:

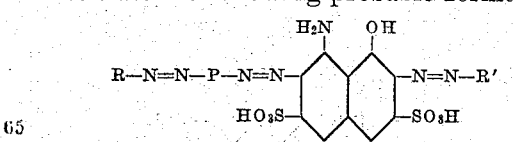

wherein R signifies an aromatic radical containing two amino groups as substitutes, P a diphenyl nucleus which may contain substituents, and R' a radical of the aromatic series, in admixture with a disazo dye having in the free state the following probable formula:

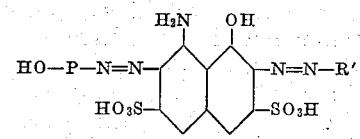

in which P represents a diphenyl nucleus which may contain substituents, and R' a radical identical with that similarly designated in the trisazo dyestuff component.

9. As a new product, the polyazo coloring matter which is free from chrysoidine bodies, and comprising a trisazo dyestuff of the following probable formula:

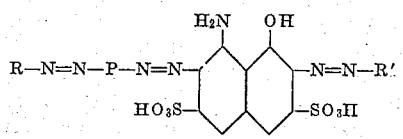

wherein R represents an aromatic radical containing two amino groups as substituents, P a benzidine nucleus which may contain substituents, and R' a hydrocarbon radical of the benzene series, in admixture with a disazo dyestuff having the following probable formula:

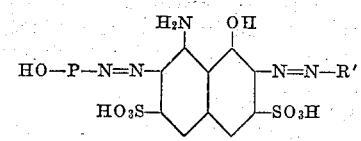

in which P represents a diphenyl nucleus which may contain substituents, and R' a hydrocarbon radical identical with that similarly designated in the trisazo dyestuff component.

10. As a new product, the polyazo dyestuff which is free from chrysoidine bodies, and which comprises a trisazo dyestuff of the following probable formula:

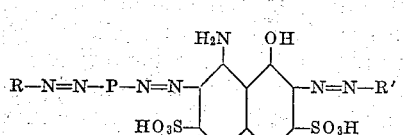

wherein R signifies a meta-diamine radical of the benzene series, P a diphenyl nucleus which may contain substituents, and R' a hydrocarbon radical of the benzene series, in admixture with a disazo dyestuff having the following probable formula

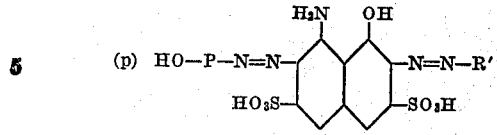

wherein P represents a diphenyl nucleus and R' a hydrocarbon radical identical with that present and similarly designated in the trisazo dyestuff component.

11. As a new product, the polyazo dyestuff which is free from chrysoidine bodies, and which comprises a trisazo dyestuff of the following probable formula:

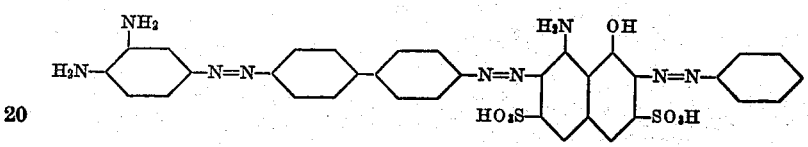

in admixture with the disazo dyestuff having the following probable formula:

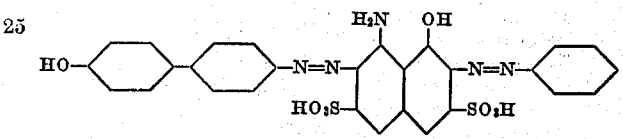

12. Material dyed with the dyestuff of claim 8.

13. Material dyed with the dyestuff of claim 9.

14. Material dyed with the dyestuff of claim 10.

15. Material dyed with the dyestuff of claim 11.

In testimony whereof I affix my signature.
WALTER M. RALPH.

Certificate of Correction

Patent No. 1,832,322. Granted November 17, 1931, to

WALTER M. RALPH

It is hereby certified that error appears in the printed specification of the above-numbered patent requiring correction as follows: Page 1, line 88, for "contamination" read *contaminating;* page 2, line 127, for "m-tolyenedia-" read *m-tolylenedia-;* page 4, line 67, claim 8, for "substitutes" read *substituents;* page 5, between lines 15 and 20, claim 11, strike out the formula and insert instead

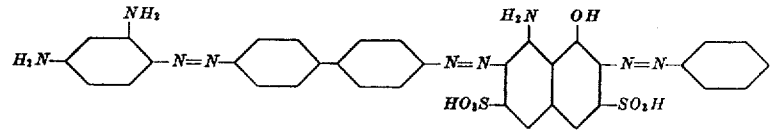

and that the said Letters Patent should be read with these corrections therein that the same may conform to the record of the case in the Patent Office.

Signed and sealed this 29th day of December, A. D. 1931.

[SEAL.]

M. J. MOORE,
*Acting Commissioner of Patents.*